United States Patent [19]

Blake

[11] 3,856,335
[45] Dec. 24, 1974

[54] ROLLING DIAPHRAGM SLIP JOINT
[76] Inventor: Alexander Blake, 550 Escondido Cir., Livermore, Calif. 94550
[22] Filed: Nov. 16, 1973
[21] Appl. No.: 416,554

[52] U.S. Cl. .............................. 285/286, 285/302
[51] Int. Cl. ............................................. F16l 13/02
[58] Field of Search ........................ 285/302, 286; 188/1 A–1 D; 72/316, 391; 74/492; 267/116

[56] References Cited
UNITED STATES PATENTS
3,146,014  8/1964   Kroell .................................... 188/1
3,224,598  12/1965  Austgen .............................. 285/302
3,416,819  12/1968  Day ..................................... 285/302
3,511,345  5/1970   Takamatsu et al. .................... 188/1
3,594,021  7/1971   Williams ............................. 285/302
3,599,757  8/1971   Takamatsu et al. .................... 188/1

FOREIGN PATENTS OR APPLICATIONS
1,493,130  7/1967   France .............................. 285/302

Primary Examiner—Dave W. Arola
Attorney, Agent, or Firm—John A. Horan; Frederick A. Robertson; John H. G. Wallace

[57] ABSTRACT

A slip joint for preventing or mitigating shock damage to emplacement casing strings and access pipes for underground explosive devices. Shock energy is absorbed by the plastic deformation of a rolling annular diaphragm connecting adjacent casing sections.

1 Claim, 1 Drawing Figure

PATENTED DEC 24 1974 3,856,335
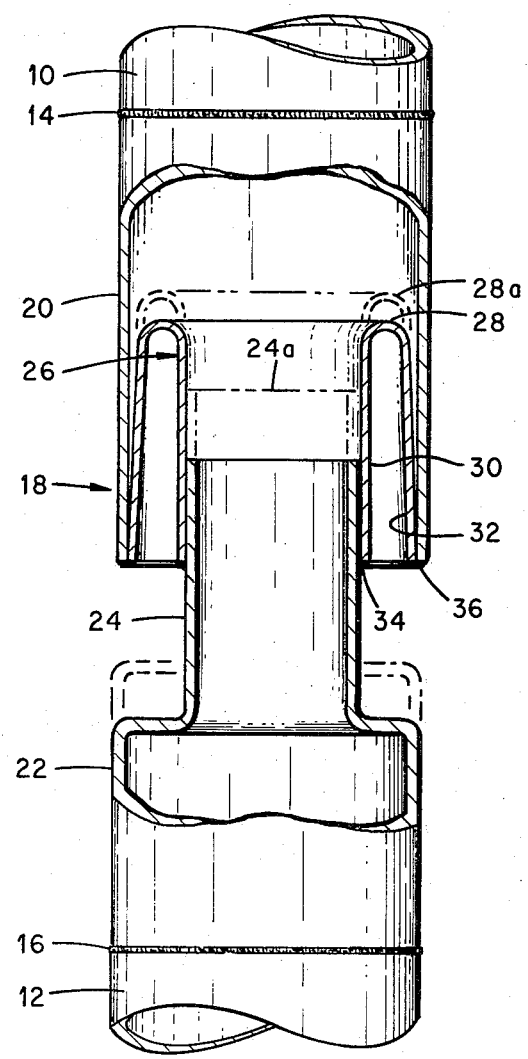

ROLLING DIAPHRAGM SLIP JOINT

BACKGROUND OF THE INVENTION

The invention disclosed herein was made under, or in the course of, Contract No. W-7405-ENG-48 with the United States Atomic Energy Commission.

This invention relates to slip joints for connecting adjacent sections of conduit members between which relative axial movement may occur. In particular, the invention relates to slip joints for preventing or mitigating shock damage to emplacement casing strings, access pipes and the like employed in the underground emplacement and use of nuclear and other explosive devices.

It is customary practice, in the employment of underground nuclear and other explosive devices, to install and service them through drilled bore holes lined with steel casing or pipe, in order to prevent the intrusion of ground water, entry of rock fragments and other debris, or collapse of the bore. The liner casing is installed section by section as drilling proceeds, each added section being rigidly joined to the preceding section, usually be welding.

Upon detonation of the explosive device, force from the explosion is exerted upon the casing, causing destruction of its lower terminal portion and the transmission of a compressive shock along the string. The surviving lower portion of the casing is violently displaced along the bore, resulting in damage to or destruction of apparatus, instrumentation and service connections secured to and supported by the casing at various locations along its length, remote from the situs of the explosion.

Thus, it will be seen that some sort of slip joint is desirable between sections of the casing enabling portions of it to yield and shorten and thus to absorb some of the shock of violent axial displacement caused by the explosion. Additionally, it is desirable to maintain the fluid-tight integrity of the casing during the emplacement and servicing of the explosive device and to compensate for some radial and some angular misalignment or cocking of casing sections which may be caused by occasional local deviation of the bore from intended axial alignment. It is desirable that the slip joint be capable of taking the load of pulling the sections of casing depending from it, without permanent change in length, since it may sometimes be necessary to lift a portion or all of the string during emplacement or recovery operations. It is also desirable that the slip joint be completely sealed fluid tight in order to prevent the entry of ground water into the casing.

SUMMARY OF THE INVENTION

An annular convolution or diaphragm of relatively thick metallic plate is interposed between and welded to telescoped concentric tubular members attached to or forming part of adjacent casing sections. While capable of taking, without permanent deformation, the loads of handling, installation and pulling during emplacement or recovery operations, the diaphragm rolls between the telescoped members to absorb in plastic deformation the very large load and movement imparted to the casing by the shock of the underground detonation.

It is therefore an object of the invention to provide a slip joint for strings of casing pipe sections which will afford absorption and attenuation of shock energy and accommodation of relative movement between contiguous casing sections.

It is another object of the invention to provide a slip joint for pipe strings which will accommodate some radial and angular misalignment between adjacent casing sections while maintaining its fluid-tight integrity.

It is a further object of the invention to provide a flexible, shock-absorbing slip joint for subterranean pipe strings which will permit the handling, lifting and lowering of casing to which it is attached, without taking a permanent set and without impairment of its flexibility and its ability to absorb shock.

These and other objects of the invention will be apparent as the ensuing description proceeds, and from the appended drawing.

DESCRIPTION OF THE DRAWING

In the accompanying drawing of a preferred embodiment of the invention, the single figure is a cut-away view of a slip joint for the casing of a subterranean bore, showing in cross-section the construction of the joint.

DESCRIPTION OF A PREFERRED EMBODIMENT

Referring to the drawing, there are shown the ends of an upper casing 10 and a lower casing 12 of a steel pipe string employed for lining a subterranean bore extending to the underground emplacement of a nuclear explosive. Upper and lower casings 10 and 12 are connected by welds 14 and 16, respectively, to the upper and lower ends of a slip joint indicated generally at 18.

The slip joint 18 includes an upper collar 20, circumferentially welded at 14 to the upper casing 10, and a lower collar 22, circumferentially welded at 16 to the lower casing 12. The collar 22 has a reduced section 24, coaxial with it and extending concentrically into the lower portion of the collar 20. In the clearance between the reduced section 24 and the collar 20, there is disposed an annular rolling diaphragm, indicated generally at 26 and having an integral generally semi-toroidal convolution 28, an integral inner sleeve 30 and an integral outer sleeve 32. The inner sleeve 30 is secured by an annular weld 34 to a mid-portion of the reduced section 24, and the outer sleeve 32 is secured by an annular weld 36 to the lower end of the collar 20.

In operation, when a sufficiently heavy shock, such as that from a nuclear detonation, is received on the lower casing 12, the reduced section 24 of the collar 22 is driven upwardly, for example, to the position indicated at 24a, pulling the inner sleeve 30 with it while the outer sleeve 32 is fixed to the collar 20, thus rolling the convolution 28 of the diaphragm 26 to the position indicated at 28a. In the process, the diaphragm 26 being made of annealed or mild steel, for example, is plastically deformed, absorbing some of the energy of the shock in its plastic deformation.

It will be noted that the slip joint 18 is completely sealed by welding and does not rely upon sliding seals as do the telescoping joints of the prior art. It will also be noted that the slip joint of the present invention permits some degree of axial and radial misalignment, since there is a small amount of flexibility in the convolution 28 and since the reduced section 24 does not fit tightly within the collar 20. Additionally, because the convolution 24 is relatively thick and its rolling radius relatively small, the slip joint 18 will normally sustain the load of pulling a string of casing without taking a permanent set.

What I claim is:

1. A shock-absorbing fluid-tight slip joint for attenuating the transmission of axial compressive shock loads from one bore hole casing member to another, said slip joint having:

a first collar member continuously welded at one end to one of said casing members and coaxial therewith;

a second collar member continuously welded at one end to the other of said casing members and coaxial therewith, said second collar member having an extension of reduced size extending into said first collar member, concentrically therewith and defining an annular clearance therebetween;

a generally annular diaphragm extending between said collar members and coaxial therewith, said diaphragm having a generally semi-toroidal convolution with inner and outer concentric sleeves integral therewith and extending therefrom, the inner sleeve at its end distal to said convolution being continuously welded to a mid-region of said extension of said second collar member, and the outer sleeve at its end distal to said convolution being continuously welded to the other end of said second collar member, said diaphragm being disposed generally within said annular clearance and substantially free of contact with said collar members except where welded thereto, whereby to accommodate minor misalignment of said casing members, said diaphragm being stiff and made of relatively thick but ductile material, plastically deformable by the rolling of said convolution upon the application of severe axial compressive shock to one of said casing members, whereby to absorb energy from said shock and mitigate its transmission along said casing, yet permit the pulling of said casing members from said bore hole without permanent elongation of said joint.

* * * * *

UNITED STATES PATENT OFFICE
CERTIFICATE OF CORRECTION

Patent No. 3,856,335            Dated December 24, 1974

Inventor(s) Alexander Blake

It is certified that error appears in the above-identified patent and that said Letters Patent are hereby corrected as shown below:

after [76]

-- [73] Assignee: The United States of America as represented by the United States Atomic Energy Commission, Washington, D. C. --

Signed and sealed this 6th day of May 1975.

(SEAL)
Attest:

RUTH C. MASON
Attesting Officer

C. MARSHALL DANN
Commissioner of Patents
and Trademarks